US010258022B2

(12) United States Patent
Watts

(10) Patent No.: US 10,258,022 B2
(45) Date of Patent: Apr. 16, 2019

(54) ROPE TUG TOY

(71) Applicant: GOSLING, INC., Thousand Oaks, CA (US)

(72) Inventor: Nicholas Watts, Thousand Oaks, CA (US)

(73) Assignee: THE KYJEN COMPANY, LLC, Centennial, CO (US)

( * ) Notice: Subject to any disclaimer, the term of this patent is extended or adjusted under 35 U.S.C. 154(b) by 135 days.

(21) Appl. No.: 15/621,233

(22) Filed: Jun. 13, 2017

(65) Prior Publication Data

US 2017/0354122 A1 Dec. 14, 2017

Related U.S. Application Data

(60) Provisional application No. 62/350,104, filed on Jun. 14, 2016.

(51) Int. Cl.
*A01K 29/00* (2006.01)
*A01K 15/02* (2006.01)
*A63H 9/00* (2006.01)

(52) U.S. Cl.
CPC ............ *A01K 15/025* (2013.01); *A01K 29/00* (2013.01); *A63H 9/00* (2013.01)

(58) Field of Classification Search
CPC .... A01K 15/025; A01K 29/00; A01K 15/026; A01K 15/02; A63H 5/00; A63H 3/28
See application file for complete search history.

(56) References Cited

U.S. PATENT DOCUMENTS

| | | | | |
|---|---|---|---|---|
| 2,003,958 | A * | 6/1935 | Salisbury | A63H 5/00 119/709 |
| 4,223,636 | A * | 9/1980 | Dishong | A01K 15/025 119/709 |
| 6,582,274 | B1 * | 6/2003 | Chernek | A63H 5/00 446/188 |
| 6,892,674 | B1 * | 5/2005 | Dubinins | A01K 15/026 119/702 |
| 6,918,355 | B1 * | 7/2005 | Arvanites | A01K 15/026 119/707 |
| 8,573,159 | B1 * | 11/2013 | Crotty | A01K 15/025 119/707 |
| 2009/0084325 | A1 * | 4/2009 | Moskoff | A01K 15/025 119/707 |
| 2011/0005468 | A1 * | 1/2011 | Piety | A01K 15/025 119/707 |
| 2011/0226191 | A1 * | 9/2011 | Curry | A01K 15/025 119/707 |

(Continued)

Primary Examiner — Trinh T Nguyen

(57) ABSTRACT

A pet tug toy including a noise maker bladder sewn along a squeaker rope that may have pet handles or other shapes at its distal ends, and which rope extends through a tubular channel of a center section and that causes a burst of sound when the squeaker rope is pulled though the tubular channel, with the squeak sound emitted either when a squeaker in the squeaker rope is compressed by direct pressure applied by the pet to that part of the squeaker rope encompassing a squeaker bladder, or alternatively by compression of one or more of the squeak bladders positioned inside of the rope when the rope is pulled through the channel, and with the toy formed into various shapes including animal shapes such as the shape of a monkey, alligator, crocodile, cow and rabbit, for example.

11 Claims, 9 Drawing Sheets

(56) References Cited

U.S. PATENT DOCUMENTS

| | | | | |
|---|---|---|---|---|
| 2012/0067294 A1* | 3/2012 | Curry | .................. | A01K 15/025 |
| | | | | 119/707 |
| 2012/0090554 A1* | 4/2012 | Nunn | .................. | A01K 15/025 |
| | | | | 119/707 |
| 2012/0103274 A1* | 5/2012 | Curry | .................. | A01K 15/025 |
| | | | | 119/707 |
| 2014/0130748 A1* | 5/2014 | Curry | .................. | A01K 15/025 |
| | | | | 119/707 |

* cited by examiner

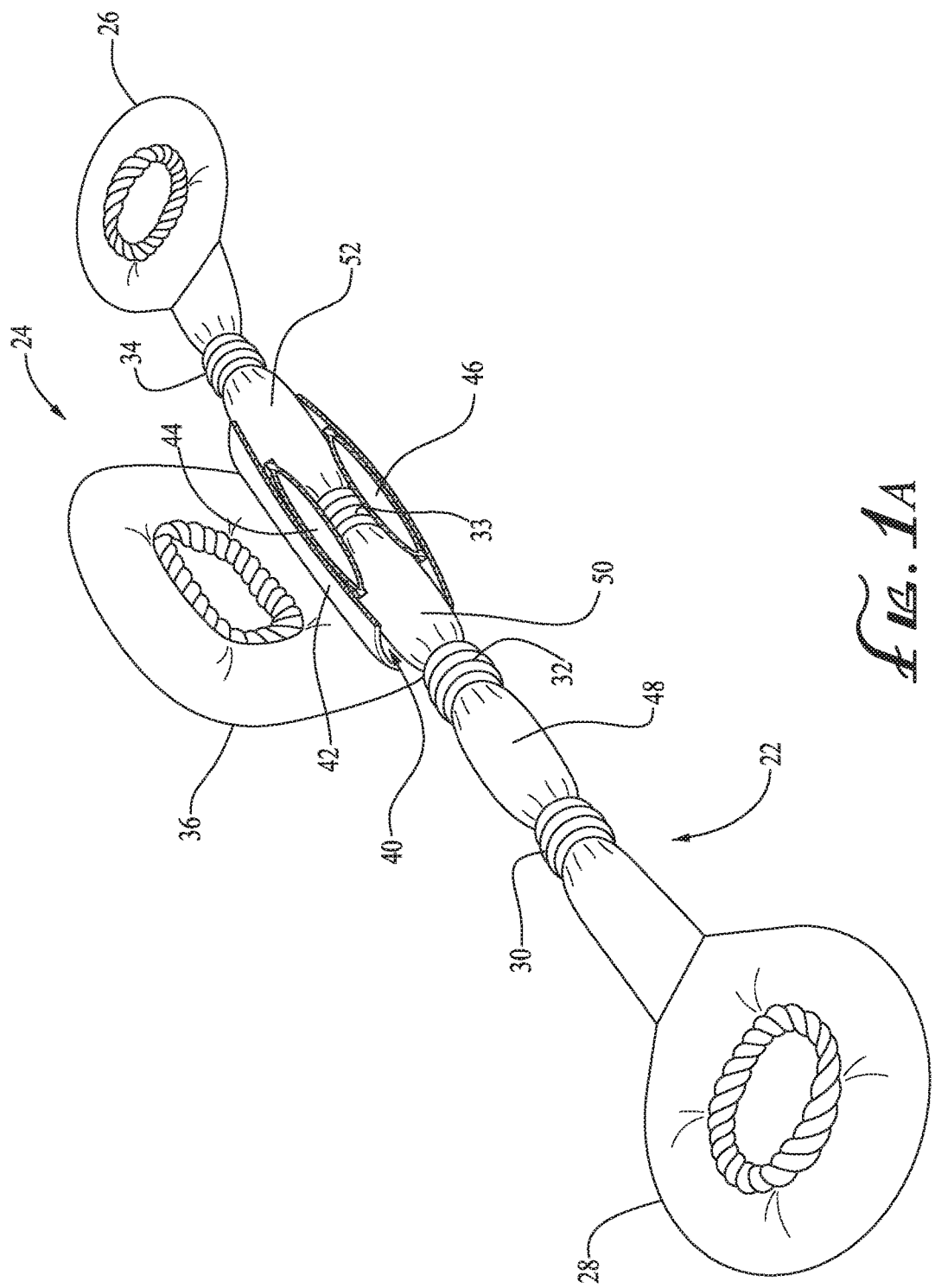

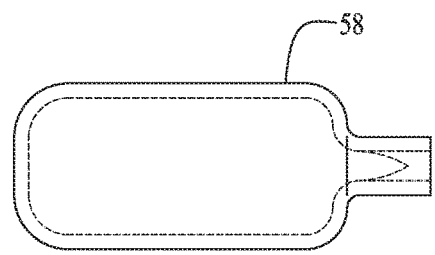
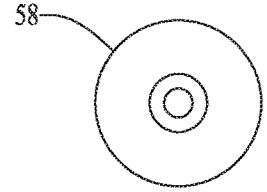
FIG. 4A
FIG. 4B
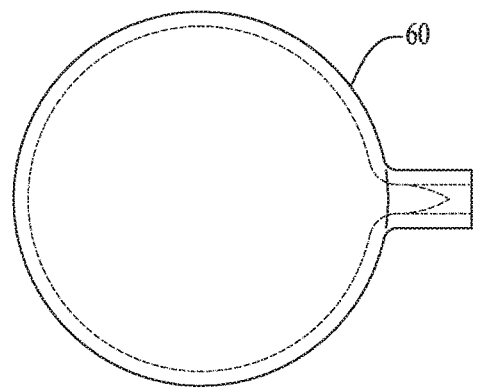
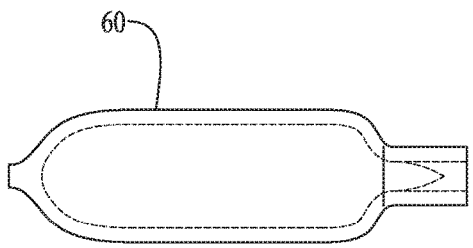
FIG. 4C
FIG. 4D
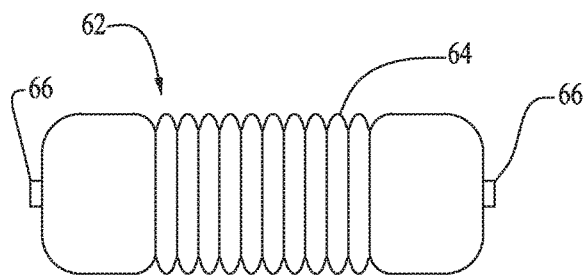
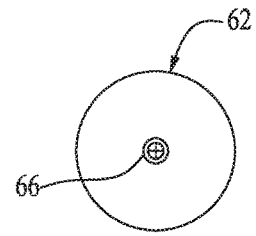
FIG. 4E
FIG. 4F

ROPE TUG TOY

FIELD OF INVENTION

The invention relates generally to tug toys, particularly a tug toy used by a pet.

BACKGROUND

Pet toys are a segment of the pet industry that includes many different functions, materials and purposes. For example, a tug toy may be is used as an interactive device between the pet and owner, a training tool for pets or just for pure entertainment for the owner and the owner's pet. Noise makers incorporated in pet toys are very common, however, no currently known tug toy is capable of emitting a sound when a length of material containing squeakers (squeaker rope) is pulled through a channel whose inner diameter is relatively small in comparison to the outer diameter of the squeaker rope, and functions to cause constriction of one or more bladder type noise makers positioned inside of the squeaker rope.

SUMMARY OF INVENTION

The various embodiments according to the present disclosure overcome the drawbacks of known pet tug toys by providing for several squeaker bladders and for activating the bladders by novel means.

The noise makers are preferably placed intermittently along the squeaker rope, and cause a burst of sound while the squeaker rope is pulled though the channel. The squeak sound is emitted either when a squeaker in the squeaker rope is compressed by direct pressure applied by the pet to that part of the squeaker rope encompassing a squeaker bladder, or alternatively by compression of the squeak bladder(s) positioned inside of the rope when the rope is pulled through the channel.

In one embodiment of the claimed invention, a tug toy includes at least two gripping members that are used to pull the squeaker rope through a channel. A third, and optionally, a fourth gripping member is attached to the channel. The channel is the area through which the squeaker rope is pulled through, and causes the noise maker to be activated. The channel compresses squeakers inside of the squeaker rope because of the tight passageway inside the channel that the squeaker rope has to pass through.

In one embodiment the squeaker rope has noise makers placed incrementally between elastic breaks preferably sewn along the squeaker rope. The elastic breaks preferably are sewn at approximately 3-inch spacings along the squeaker rope. At each end of the rope is a gripping member that is gripped by a pet and used to pull the squeaker rope through the chamber; however, the squeaker rope can be pulled at any section along its length in order to pull the squeaker rope through the chamber.

In one embodiment the channel has one gripping member. This gripping member can be used to hold the channel in place for the squeaker rope to pass through.

In one embodiment, a gripping member is filled with conventional polyester material. The polyester material provides for further compression when the squeaker rope passes through the channel.

In another embodiment, the channel includes a noise maker encapsulated in a pocket sewn into a side of the channel. A second noise maker preferably is encapsulated in a second pocket sewn into the opposite side of the channel.

Embodiments, examples, features, aspects, and advantages of the present disclosure will become better understood with regard to the following description, appended claims and accompanying drawings.

BRIEF DESCRIPTION OF THE DRAWINGS

The foregoing aspects and the attendant aspects of the present disclosure will become more readily appreciated by reference to the following detailed description, when taken in conjunction with the accompanying drawings, wherein:

FIG. 1A is a cutaway view of FIG. 1, showing upper bladders and lower bladders positioned in the lower part of the handle.

FIG. 4A is a side elevation view of one of the bladders that is positioned inside of the rope of the FIG. 1 embodiment;

FIG. 4B is an end view of the FIG. 4A bladder;

FIG. 4C is a top plan view of one of the bladders that is positioned in the center section above and below the channel;

FIG. 4D is a side elevation view of one of the FIG. 4C bladder;

FIG. 4E is a side elevation view of an alternate embodiment bladder that may be positioned inside of the rope as shown in FIG. 2;

FIG. 4F is an end view of the FIG. 4E alternate embodiment;

Reference symbols or names are used in the Figures to indicate certain components, aspects or features shown therein. Reference symbols common to more than one Figure indicate like components, aspects or features shown therein.

DETAILED DESCRIPTION

Figure 1:
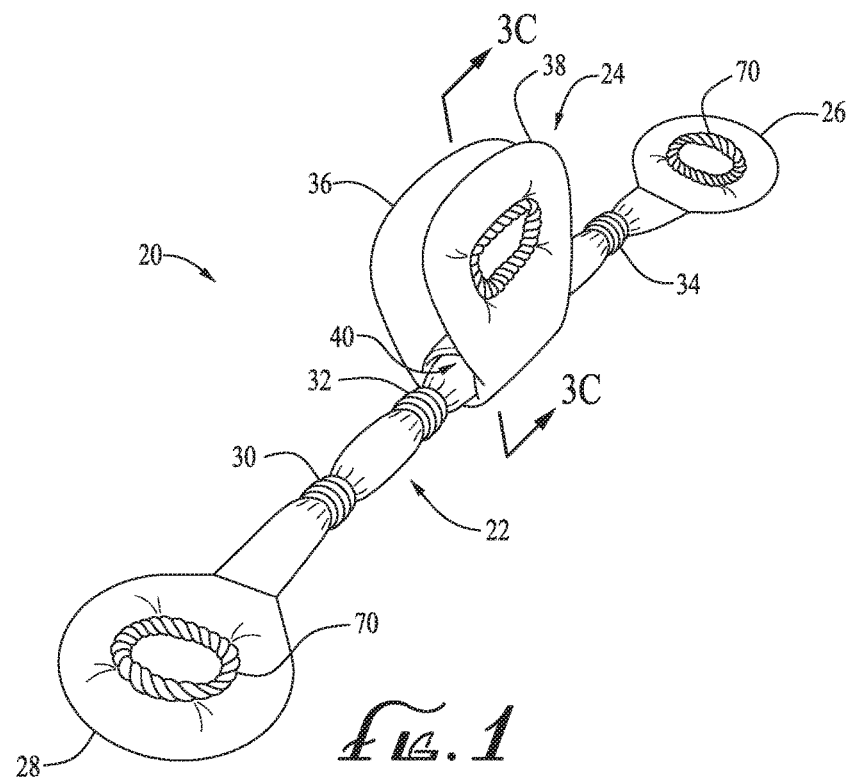
FIG. 1 is a front, top, off-longitudinal centerline perspective view illustrating a preferred embodiment of the disclosed tug toy and with handles of the central section optionally formed into two parts and then folded together to form a user handle.

In accordance with embodiments described herein a preferred embodiment pet rope tug toy is described with reference to FIGS. 1-9C. As shown in FIG. 1 tug toy 20 includes rope 22 and center section 24. As shown in FIGS. 1 and 1A, rope 22 includes first pet handle 26, second pet handle 28, and a plurality of collars or bands 30, 32, 33, 34. Center section 24 includes first user handle 36, second user handle 38 and center section channel 40, which encompasses rope 22 and through which rope 22 passes during normal use. In an alternate preferred embodiment the user handle is of a unitary construction rather than of a two-section construction as shown in FIGS. 1-2

Referring to FIG. 1A channel 40 is defined by cylinder 42. Channel 40 also, preferably includes an upper squeak bladder 44 and a lower squeak bladder 46. The squeak bladders 44, 46 are conventional bladders that are made of flexible plastic and have at least one valve positioned in a wall of the bladder. As is well known in this field, the bladder is filled with air at atmospheric pressure during the resting position of the tug toy and upon squeezing or compression; air is forced out of the valve and causes a noise, typically a squeak, to be created. Such conventional are available in various sizes. Preferably the channel cylinder is unitary with the center section 24, and both of which are preferably made of flexible, tough, durable material such as corduroy or nylon to withstand rough play with a pet such as a tough chewing dog.

Figure 2:
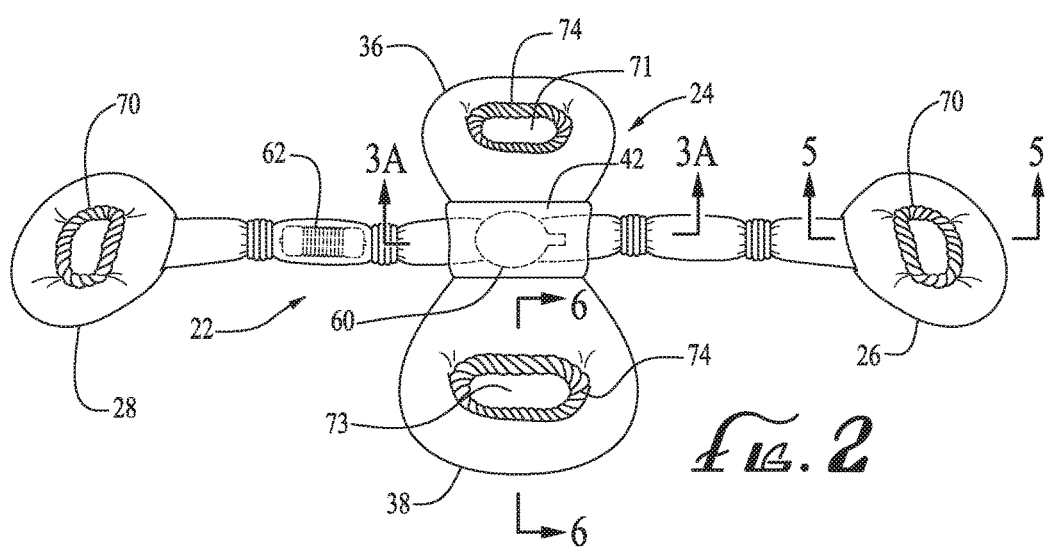
FIG. 2 is a side, upper side, perspective view of the FIG. 1 embodiment, and with the handles of the central section spread apart.

The center section 24 is flexible in that its handles fold around and over the channel 40 and cylinder 42 to form a handles adapted for gripping by the human user, as shown in FIGS. 1, 1A and 2. The two-part handles 36, 38, in one preferred embodiment each have an opening 71, 73 through which the user's hands may extend to grip the handle. The openings 71, 73 preferably have borders 74, preferably formed into a rope or rope-like material that is made of a material that is less flexible than the material of the center section 24. The handles 36, 38 are attached to or formed unitary with the cylinder 42. Cylinder 42 extends across the width of the handles 36, 38 as shown in FIG. 2, and forms a channel through which rope 22 reciprocates during use. Preferably, the inner diameter of the cylinder 42, that is, the diameter of the channel 40 is smaller than the outer diameter of the bladders positioned inside of sections 48, 50, 52 of the rope.

Additional bladders may be positioned in other locations in the toy 20. The center section includes upper center section bladder 44 and lower center section bladder 46 of the type 60 shown in FIGS. 4C and 4D. Bladders 58, as shown in FIGS. 4A and 4B are preferably positioned in the rope sections, such as sections 48, 50 and 52 (and not shown in FIGS. 1 and 1A). Alternate bladder 62, shown in FIGS. 4E and 4F may be placed inside the tube sections, one of which is shown in dashed lines 62 in FIG. 2. Alternate bladder 62 may also be place in one or more of the rope sections, as shown in FIG. 2. Bladder 62 includes an accordion section 64 and squeak valves 66 positioned at each end of the bladder.

Figure 5:
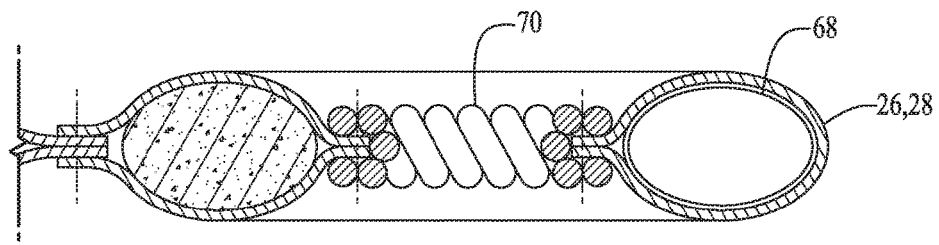
FIG. 5 is a cross-sectional view of the pet handle of the FIG. 1 embodiment, taken through line 5-5 of FIG. 2.
Figure 6:
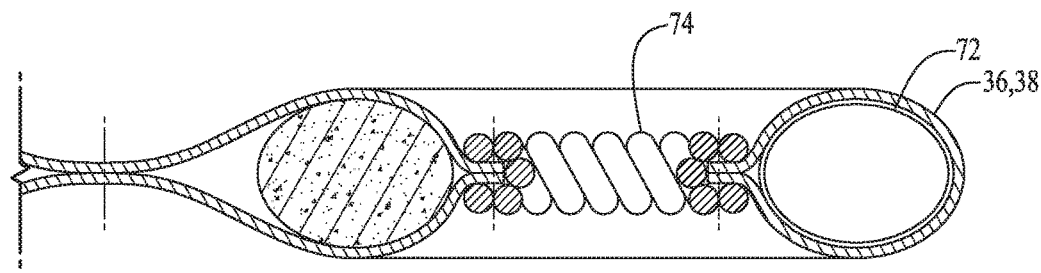
FIG. 6 is a cross-sectional view of the user handle of the FIG. 1 embodiment, taken through line 6-6 of FIG. 2.
Figure 7:
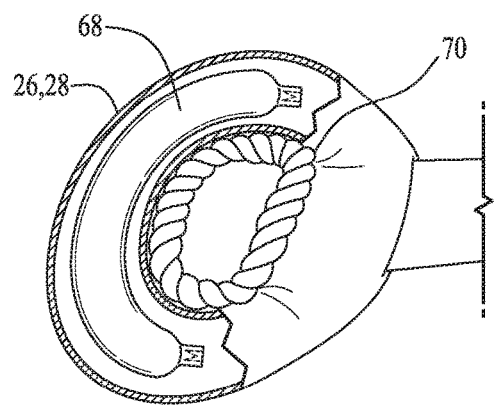
FIG. 7 is a perspective view of one of the pet handles of the FIG. 1 embodiment, with a cutaway portion showing an internal squeak bladder.
Figure 8:
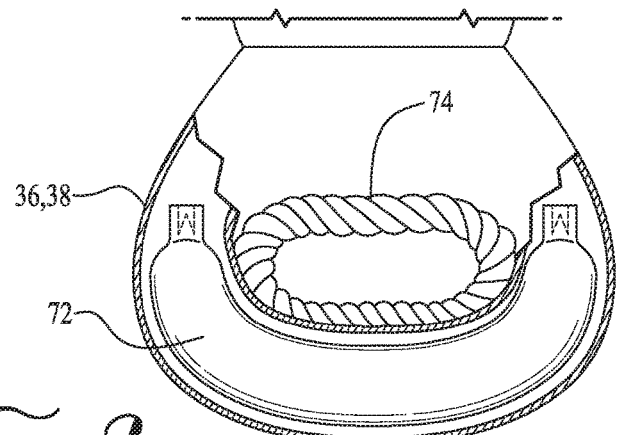
FIG. 8 is a perspective view of one of the user handles of the FIG. 1 embodiment, with a cutaway portion showing an internal squeak bladder.

Pet handles 26, 28 preferable include another bladder, with bladder 68 shown in in FIGS. 5 and 7. Pet handle rope grip 70 is also shown in FIGS. 5 and 7. User handles 36, 38 preferably also include squeak bladders 72 and rope handle grips 74, as shown in FIGS. 6 and 8.

Figure 3A:
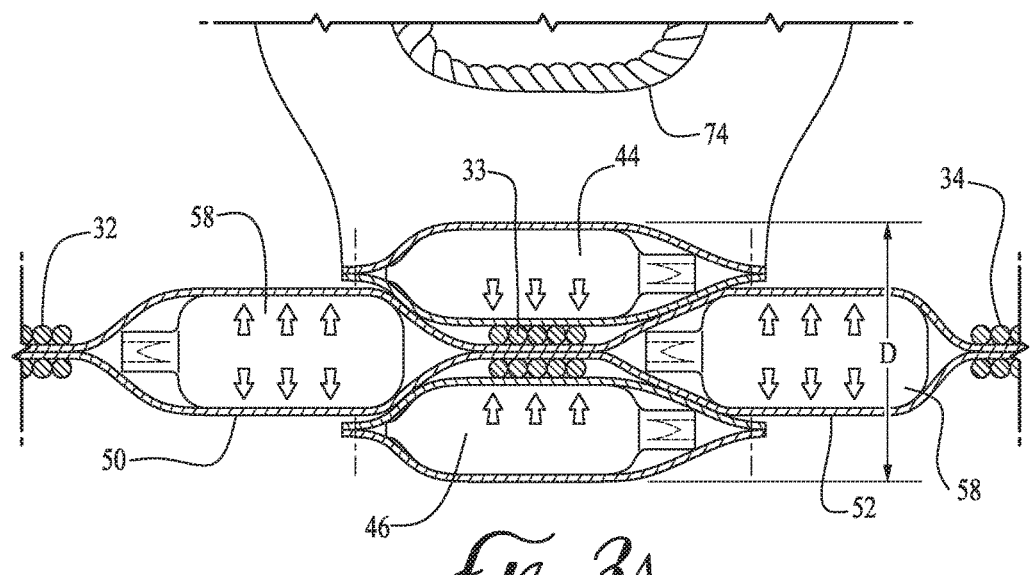
FIG. 3A is a cross-sectional view of the FIG. 1 embodiment taken through line 3A-3A of FIG. 2, when the rope is in a position relative to the center section cylindrical channel such that none of the bladders in the rope has entered the relatively narrow channel.
Figure 3B:
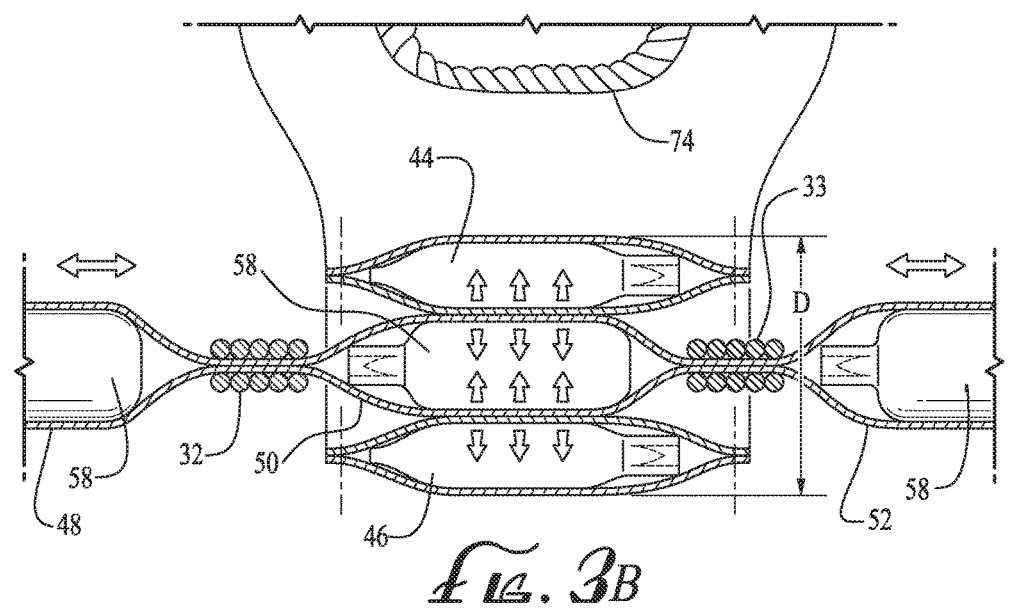
FIG. 3B is a cross-sectional view of the FIG. 1 embodiment taken through line 3A-3A of FIG. 2, but when the rope is in a position as shown in FIG. 1, that is, when the rope has been moved from the position as shown in FIG. 3A, and that one of the bladders in the rope has entered the relatively narrow channel such that the bladder in the rope, and the upper and lower bladders positioned at the top of the channel and at the bottom of the channel, respectively are being compressed and causing the squeak valve in each of those bladders to emit a sound.
Figure 3C:
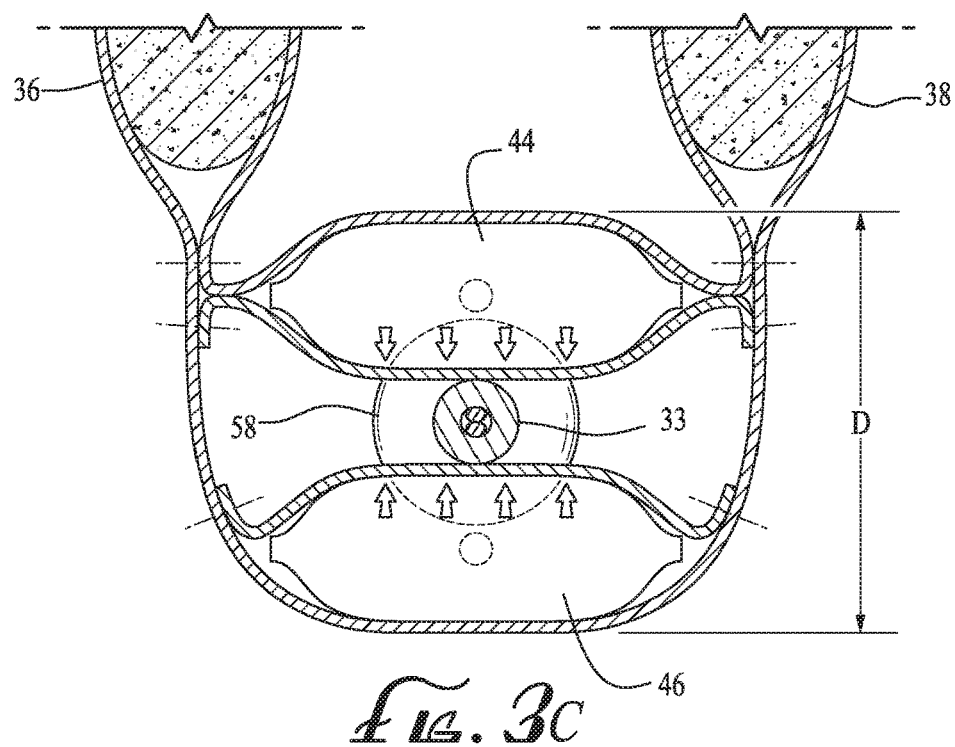
FIG. 3C is a cross-sectional view of the FIG. 1 embodiment taken through line 3C-3C of FIG. 1, when the rope is in a position relative to the center section cylindrical channel such that none of the bladders in the rope has entered the relatively narrow channel.
Figure 3D:
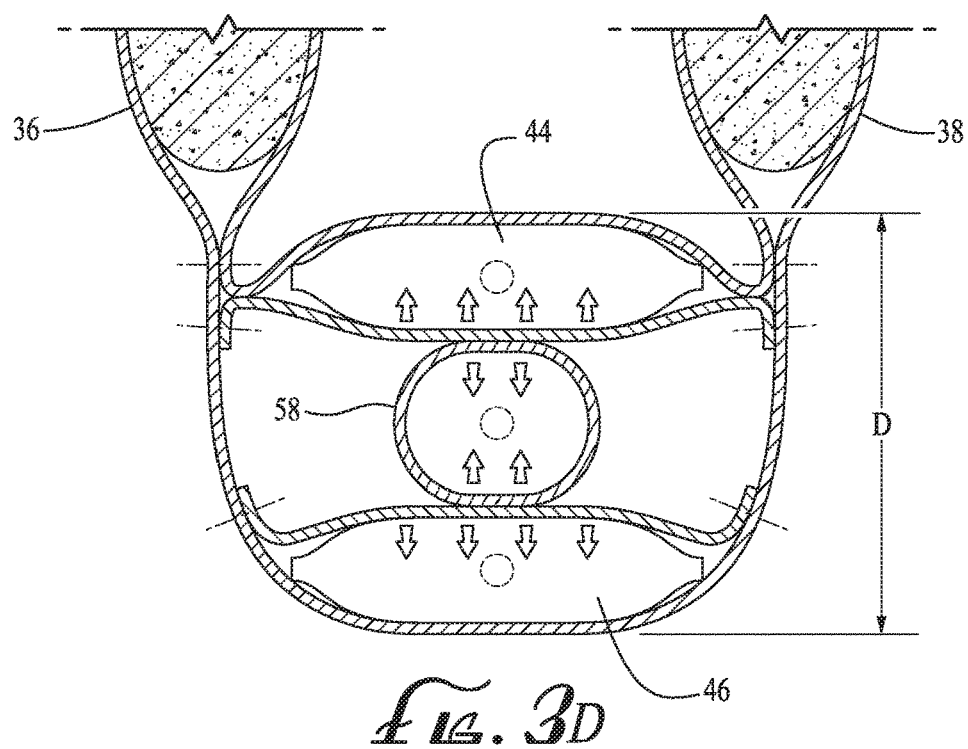
FIG. 3D is a cross-sectional view of the FIG. 1 embodiment taken through line 3C-3C of FIG. 1, but when the rope has been moved from the position as shown in FIG. 3A, and that one of the bladders in the rope has entered the relatively narrow channel such that the bladder in the rope, and the upper and lower bladders positioned at the top of the channel and at the bottom of the channel, respectively are being compressed and causing the squeak valve in each of those bladders to emit a sound.
Figure 9A:
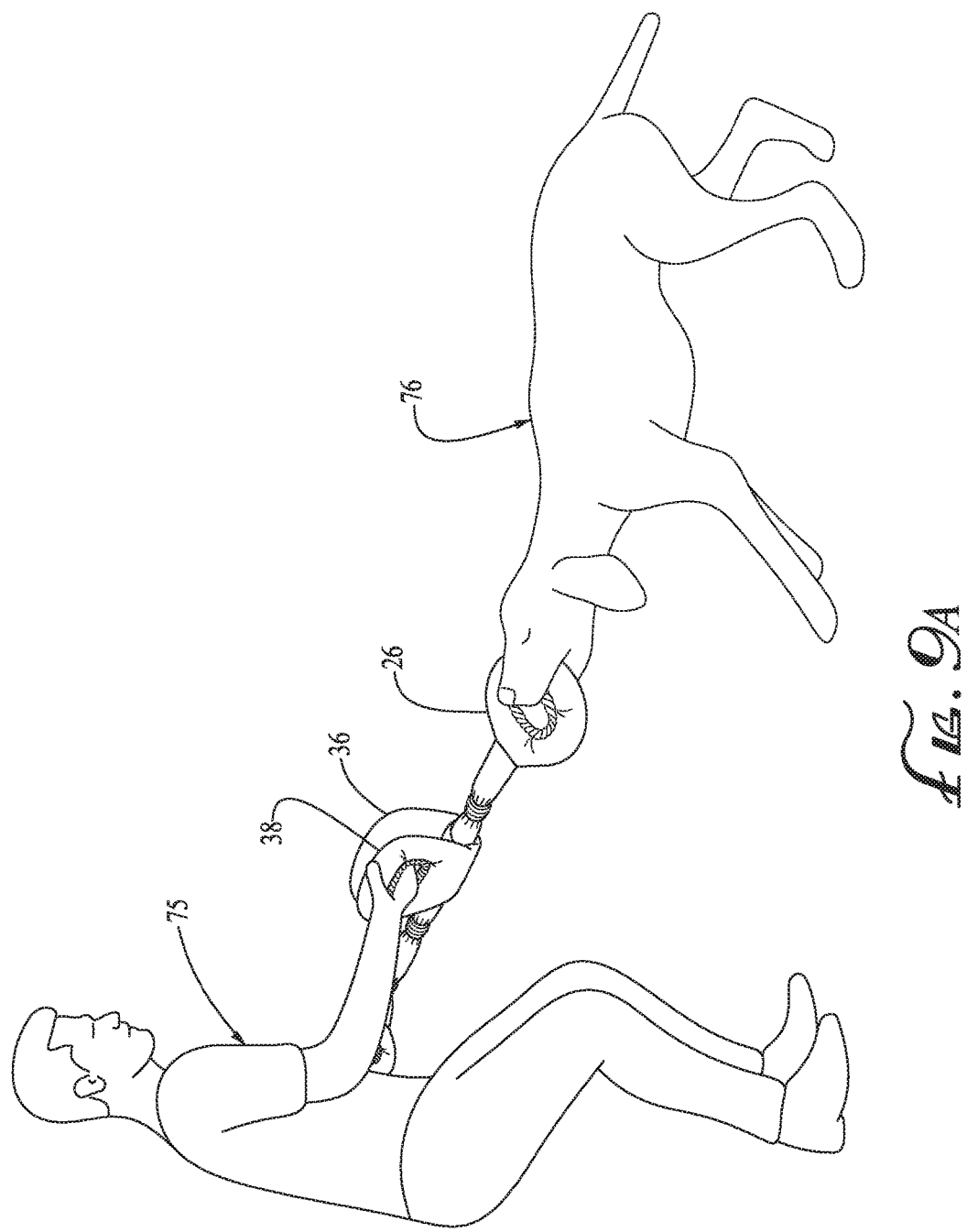
FIG. 9A is a perspective view of the FIG. 1 embodiment in use as a dog begins to bite the pet handle but before the rope moves through the channel in the center section.
Figure 9B:
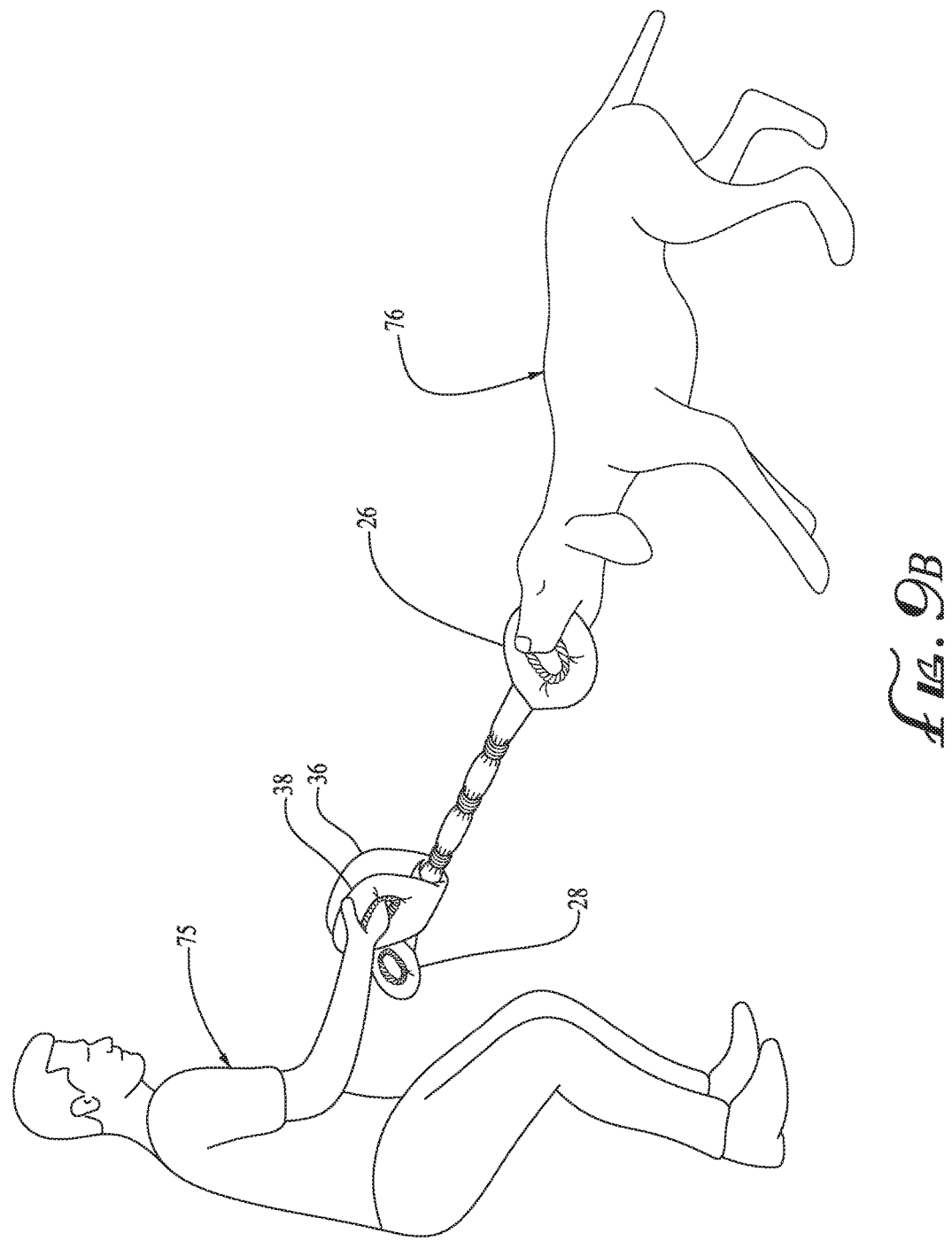
FIG. 9B is a perspective view of the FIG. 1 embodiment in use as in FIG. 2, showing the dog biting the pet handle and as the rope moves through the channel in the center section; and, FIG. 9C is a perspective view of the FIG. 1 embodiment in use as two dogs bite the pet handle and tug the rope back and forth through the center section channel.

With reference to FIGS. 9A-9B, a user 75 is shown holding user handles 36, 38 and a pet dog 76 is shown biting and tugging pet handle 26 in a direction to the right in the orientation shown in FIGS. 1, 1A and 2. Referring to FIGS. 3A and 3B the squeakers operate as the rope is tugged by the pet and causes the rope to slide though the channel 40. The channel 40 has a diameter D, as shown in FIGS. 3A-D. FIGS. 3A and 3C show bladder 58 inside of rope section 50 when the bladder 58 is not in the channel. The arrows inside of the bladders show that the rope bladders 58 and the channel bladders 44, 46 are fully inflated. The outer diameters of the each of the bladders 44, 46, 58 are smaller than the diameter D of the channel 40/tube 42, but the combined diameter of the three bladders, when inflated, is greater than D. As the rope is tugged and moved through the channel 40/tube 42, the bladders 44, 46, 58 are compressed, causing air to be forced through the squeak valves and make a squeaking noise. The horizontal arrows in FIG. 3B show the direction in which the rope is tugged back and forth though the channel. When the rope bladders are not in the channel 40, then these bladders and the center section bladders inflate, and when the rope bladders are pulled through the channel 40 the wall of the tube 42 causes air to be forced out of these bladders and cause the squeak valve to make a noise.

Tugging of the toy 20 also causes the squeak bladders in the user handles and in the pet handle to squeak. These bladders are shown in FIG. 4-8. As shown in FIGS. 9A, 9B when in use, the user 75 grips the user handles 36, 38 and the dog 76 bites pet handle 26. When the tugging begins, compression pressure is directly applied to the user handles and pet handle, respectively, and causes the bladders to compress, which in turn causes their squeak valves to operate and make noise.

Figure 9C:
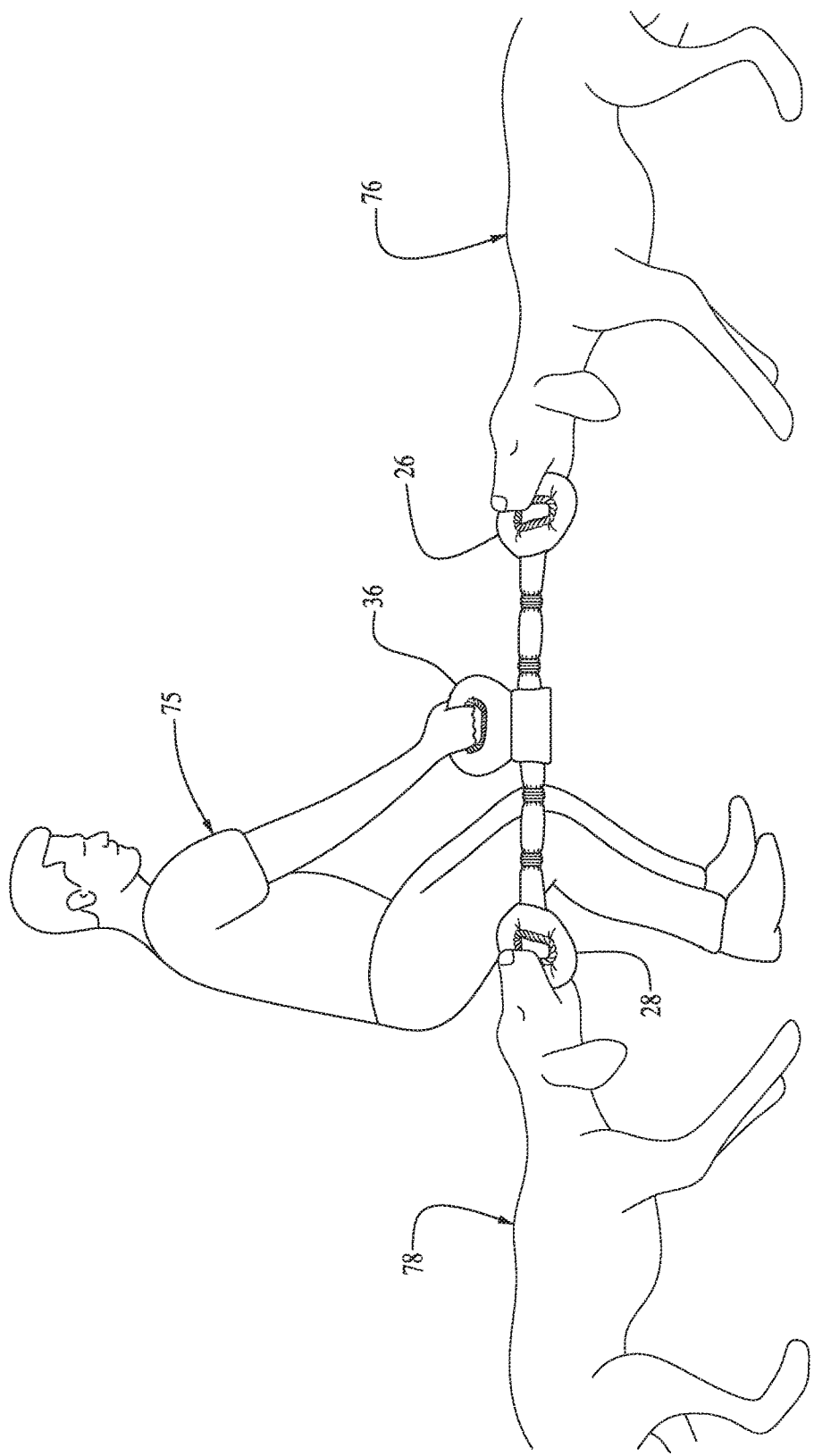

FIG. 9C shows the tug toy 20 used with two pets 76, 78, and in which use the tugging takes place between the two pets, with user 75 holding the center section handles to provide an anchor for the center section so that the rope can be moved back and forth within the channel 40 and tube 42.

Numerous, additional preferred embodiments include the feature of a cord having one or more sections containing a squeak bladder that emits a sound when passing through the center section or main body of the toy, but also include various additional structural features. For example one alternate preferred embodiment does not have handles at either end of rope whereas the FIG. 1 embodiment does include such handles. For example, in another preferred embodiment each of the distal ends of the toy could be formed as bulb or ball, and could include a squeak bladder that would be of the type shown in FIG. 4C. As examples of another type of preferred embodiment, the rope tug toy could have only pet handles, that is, with no user handle, and the pet handles could also be replace with bulbs or balls that contain squeak bladder(s), as described above. As yet additional alternate embodiments, the rope tug toy could be formed as one or more animals, with the center section of the toy, having the open channel, forming the body of the animal, and the holes through which the rope can reciprocate placed at the position of the animal's body where arms, legs, flippers, wings, etc., normally would be found.

In additional preferred embodiments, for example, the center portion or body of the tug toy could be formed as the body of a monkey, and the distal ends of the rope section of the toy could be formed as hands, as handles, or as bulbs or balls. In the monkey embodiment, the squeak bladder-containing rope would extend through the body at the position of the arms of the monkey, so that pulling the arms would result in passing the rope back and forth through the arm-holes and thus caused the bladders to squeak. In this preferred embodiment, the distal ends of the toy corresponding to the user handles of the FIG. 1 embodiment would be formed as the head and legs of the monkey, respectively.

Similarly, another alternate, preferred embodiment would be formed as a crocodile or alligator, where the rope would pass through holes in the crocodile's body at the position where its front legs would normally be positioned. In this embodiment, the distal ends of the rope could be formed as handles, as bulbs or balls, or in some other shape. In preferred crocodile/alligator embodiment, the other distal ends of the toy could be formed as the rear legs and the head of the animal, respectively, and, optionally, the body could also include a tail, with or without enclosed squeak bladders.

In yet another preferred embodiment, the rope tug toy could be formed as a cow, the distal ends of the rope formed as handles, hooves, feet, bulbs or balls. The rope would extend through the body of the cow, at the location of a cow's front legs. The first of the two other distal ends of the toy would be formed as a cow head, with a cow face and including other, optional features such horns, snout, ears, eyes, etc. The second of the two other distal ends could include legs for cow, and, optionally, a tail, with or without an enclosed squeak bladder.

In yet another preferred embodiment, the rope tug toy could formed as a rabbit, the rope part of the toy as described above, extending through the rabbit's body at the location of the front legs. The distal ends of the rope could include paws or rabbit feet, handles, bulbs or balls as described above. The orthogonal distal ends of the rabbit's body could be formed as a rabbit head, with corresponding rabbit features, such as relatively large ears, a nose and eyes. The end opposite the head end could include rear legs and a tail.

In yet other preferred embodiments, the rope tug toy could be formed as some other animal, such as a cat, fish, dolphin, whale, sheep, elephant, etc.

Although specific embodiments of the disclosure have been described, various modifications, alterations, alternative constructions, and equivalents are also encompassed within the scope of invention as set forth in the claims.

The specification and drawings are, accordingly, to be regarded in an illustrative rather than a restrictive sense. It will, however, be evident that additions, subtractions, deletions, and other modifications and changes may be made thereunto without departing from the broader spirit and scope of invention as set forth in the claims.

What is claimed is:

1. A pet tug toy comprising:
   a hollow rope having a plurality of rope chambers extending along the length of the rope and a pet handle at each distal end of the rope;
   a center section having a central tube forming a channel through which the rope extends, a first, upper squeak bladder in a pocket positioned in the upper half of the central tube, a second, lower squeak bladder in a pocket positioned in the lower half of the central tube and a user handle unitary with the center section;
   the central tube having a predetermined inner diameter;
   a third squeak bladder, having a predetermined cross-sectional diameter and positioned inside of at least one of the rope chambers; and,
   wherein upon movement of the rope though the channel air is forced out of at least one of the first, second or third squeaks bladders and causes a noise to be emitted from the tug toy.

2. The tug toy of claim 1 wherein the toy has features resembling an animal, including:
   the center section having an animal body shape; and,
   one distal end having an animal head shape.

3. The tug toy of claim 2 wherein the shape of the body resembles a monkey body.

4. The tug toy of claim 2 wherein the shape of the body resembles a crocodile body.

5. The tug toy of claim 2 wherein the shape of the body resembles a cow.

6. The tug toy of claim 2 wherein the shape of the body resembles a rabbit.

7. A tug toy comprising:
   a toy body having a first distal end, a second distal end and an open tube-shaped, open-ended channel having a predetermined inner diameter and extending through the body;
   a hollow rope having a plurality of rope chambers extending along the length of the rope, having a first distal end and a second distal end and the rope extending through the channel;
   a squeak bladder having an outer diameter and positioned in one of the rope chambers;
   the squeak bladder outer diameter being greater than the channel inner diameter;
   the body having an animal body shape;
   the first distal end having an animal head shape; and,
   whereby passing the rope through the channel causes the squeak bladder to compress and emit a sound.

8. The toy of claim 7 wherein
   the animal body shape is the shape of a monkey and the animal head shape is the shape of a monkey head.

9. The toy of claim 7 wherein
   the animal body shape is the shape of a crocodile and the animal head shape is the shape of a crocodile head.

10. The toy of claim 7 wherein
    the animal body shape is the shape of a cow and the animal head shape is the shape of a cow head.

11. The toy of claim 7 wherein
    the animal body shape is the shape of a rabbit and the animal head shape is the shape of a rabbit head.

* * * * *